(No Model.)

A. CLEVELAND.
SADDLE FOR BICYCLES.

No. 505,938. Patented Oct. 3, 1893.

WITNESSES:
Wm. H. Canfield, Jr.
F. deL. Robinson.

INVENTOR:
Arthur Cleveland,
BY Fred H. C. Fraentzel, ATT'Y.

UNITED STATES PATENT OFFICE.

ARTHUR CLEVELAND, OF NEWARK, NEW JERSEY, ASSIGNOR OF ONE-HALF TO CHARLES L. NESLER, OF SAME PLACE.

SADDLE FOR BICYCLES.

SPECIFICATION forming part of Letters Patent No. 505,938, dated October 3, 1893.

Application filed September 16, 1892. Serial No. 446,052. (No model.)

*To all whom it may concern:*

Be it known that I, ARTHUR CLEVELAND, a citizen of the United States, residing at Newark, in the county of Essex and State of New Jersey, have invented certain new and useful Improvements in Saddles for Bicycles, &c.; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My present invention has reference to that class of bicycle saddles, commonly known as "scorchers," and the primary object of the invention therefore is to provide a saddle for bicycles, which shall be adapted for use as a "scorcher" seat, or a "roadster," according to whether the rider intends to use the seat while racing, or while riding on ordinary roads. It will be understood that when the rider uses his machine for racing purposes, in working the vehicle he leans forward on his seat and the saddle is therefore fixed to the frame of the bicycle, so that it is in a forwardly and downwardly inclined position.

One of the main features of the present invention is its adaptability for use for this purpose, of a "roadster" saddle, the seat of which is always arranged in a horizontal position, or approximately so, on the frame of the machine, to a "scorcher" saddle, one saddle or seat answering this purpose, which can be automatically changed from one sitting position to another, at the will of the rider.

The invention also consists of certain other novel arrangements and combinations of parts, such as will be hereinafter more fully described and finally embodied in the clauses of the claim.

Referring to the accompanying drawings, in which similar letters of reference are employed to indicate corresponding parts, in each of the several views:—Figure 1 is a side elevation of the improved saddle, in that position when it is used as a "roadster." Fig. 2 is a longitudinal vertical section of the same, and Fig. 3 is a view similar to Fig. 1, but illustrating the saddle in its forwardly and downwardly inclined position, when used as a "scorcher." Fig. 4 is a detail section and Fig. 5 an end view of a pivotal support or socket clamp for securing the seat to the saddle-post, said views clearly illustrating the construction of the pivotal support for the seat and a spring used in connection therewith, for retaining the saddle seat in different positions. Fig. 6 is a horizontal section of a certain bearing frame and sliding bearing connected with the rear end of the saddle spring, and Fig. 7 is a vertical longitudinal section of the same, showing said frame provided with a plate having a socket for one end of stretcher spring or bar and a clip plate for attaching the said device to the cantle at the back of the seat. Fig. 8 is a plan view of an extension plate used in connection with my improved saddle. Fig. 9 is a longitudinal vertical section of the same, illustrating one arrangement of a sliding ball-bearing used in connection therewith, and Fig. 10 is a vertical cross-section taken on line 10 in Fig. 9. Fig. 11 is an inverted plan view of an improved form of spring used in connection with the saddle. Fig. 12 is a vertical cross section of the same taken on line 12—12 in said Fig. 11, and Fig. 13 is a vertical cross section of the same, taken on line 13—13 in said Fig. 11.

In said views, $a$ indicates a suitable seat, made from strong leather, having secured on its under side, at the front, the pommel $b$ and at the rear end the cantle $c$. The pommel $b$ is provided with a downwardly projecting post $b'$, to which is connected by means of a bolt or pin $b^2$, the upwardly extending post $d'$ of an extension plate $d$. Said extension plate is provided with downwardly extending ways or guides $d^2$, which are dove-tailed, as shown in Fig. 10, and upon said ways or guides is arranged a suitable slide $e$, having the downwardly projecting L-shaped side pieces $e'$ between which slides a ball $e^2$, substantially as illustrated in said Fig. 10. As will be seen from said Fig. 10, said bearing $e^2$, consists of the portion $e^3$ which slides on the L-shaped side pieces $e'$ and in the top thereof are the balls $e^4$ which move against the under side of said adjustable slide $e$.

Said extension plate $d$ is provided with an oblong opening $d^3$ and the plate $e$ with a similarly arranged opening $e^5$, in which openings I arrange a bolt $d^4$, whereby the parts can be adjusted and firmly secured in such adjusted position, while the ball-bearing $e^2$ is free to slide back and forth on the L-shaped side pieces $e'$, as will be evident. In the forward end-portions of each L-shaped side piece $e'$ is a suitable stop $e^6$, such as a pin, to prevent the displacement of the bearing $e^2$. Said bearing $e^2$ is also provided with suitable lugs or ears $e^7$ between which the forward end of the saddle spring $g$ is pivotally arranged.

The upper rear end of the extension plate $d$ may be provided with a socket $d^5$ in which can be arranged the one end of a stretcher spring $h$, when such spring is used.

At the rear end of the saddle or seat $a$ and secured in a socket of the cantle $c$, by means of a locking finger $f'$ is a suitable guide plate $f$ provided with a socket $f^2$. Said plate $f$ is provided with a suitable skeleton frame $i$ consisting essentially of the four posts $i'$ and the runners $i^2$ upon which are adapted to rotate suitable wheels $j'$ arranged on a pinion or axle $j$ which rotates in an eye at the rear end of the saddle spring $g$, substantially as shown, and as will be understood from Figs. 2, 6 and 7. The ends of the stretcher spring $h$ are arranged in said sockets $d^5$ and $f^2$ respectively, as will be seen from Fig. 2, but it will be evident that said spring can be fastened in any other well-known manner, and the saddle spring $g$ can be secured in any other well-known manner to the ends of the saddle or seat $a$.

The saddle spring $g$ is preferably concave in a certain portion thereof, as at $g'$, tapering toward the ends of the spring, whereby the body thereof is flat or straight in cross-section, as will be seen from Fig. 13.

In order to produce the tilting of the saddle, while in use, a pivotal support $k$ may be employed in connection with the post socket $l$. The socket $l$, which is provided with the usual set-screw $l'$, has two ears $l^2$ projecting up therefrom and arranged upon a pivotal pin $l^3$ passing through said ears, is a tongue $k'$ of said support $k$.

The saddle spring $g$ is arranged between the support $k$ and a holding plate $k^2$, which is firmly secured to said support by means of bolts or screws $k^3$, as will be seen more especially from Figs. 4 and 5. The lower portion of said tongue $k'$ is provided with two or more flat side portions $k^4$ and $k^5$ and from a post $l^4$ on the socket $l$ passes a flat spring $m$ which extends and passes beneath said flat portions $k^4$ and $k^5$, the end $m'$ being firmly pressed upon a flat surface $k^6$ of the post socket, as shown in Fig. 4. In this manner, when the flat surface $k^4$ is in holding contact with the upper surface of the flat spring $m$, the seat $a$ is in an approximately horizontal plane, in which position the seat must be for ordinary and comfortable riding, but as soon as the rider wishes to race, and in which case his body is thrown forward, he causes his saddle to lean downwardly and forwardly, by throwing his body forward, whereby the support $k$ swings on the pivotal pin $l^3$, until the flat portion $k^5$ comes in contact with the upper flat surface of the spring $m$. The edge $k^7$ of the support $k$ may be made to engage with an off-set $l^5$ on the post $l^4$ to limit the downward movement of the saddle. When the rider slows up, by bringing his body in an upright position on the saddle, the flat portion $k^4$ of the pivotal support $k$ is again brought into holding engagement with the spring $m$, when the saddle can be again used as a "roadster." Thus it will be seen that a saddle is the result, combining therein the features of a "scorcher" as well as a "roadster."

Of course it will be evident that the saddle spring $g$ may be of any suitable form and construction, but that form of spring illustrated more especially in Figs. 11, 12 and 13, is the preferred form.

Having thus described my invention, what I claim is—

1. In a bicycle saddle, the combination, with the saddle spring, of a saddle post socket $l$ having lugs $l^2$, a support attached to said saddle spring, said support being pivotally arranged between said ears $l^2$ and having flat surfaces $k^4$ and $k^5$, and a spring on said post socket, with which said flat surfaces are in sliding holding engagement, substantially as and for the purposes set forth.

2. In a bicycle saddle, the combination, with the seat, means for stretching the same, and a saddle spring, of a saddle post socket and a spring actuated support pivotally connected with said socket and attached to said saddle spring, for retaining the saddle in certain positions, substantially as and for the purposes set forth.

3. In a bicycle saddle, the combination, with the saddle spring, of a seat and sliding bearings connected with said seat and with one or both ends of the saddle spring, and a saddle post socket on said spring, consisting essentially of a post socket $l$ having lugs $l^2$, a support attached to said saddle spring, pivotally arranged between ears $l^2$ and having flat surfaces $k^4$ and $k^5$, and a spring $m$ on said post socket, all arranged substantially as and for the purposes set forth.

4. In a bicycle saddle, the combination, with the saddle spring, of a seat and sliding bearings connected with said seat and with one or both ends of the saddle spring, one of said bearings comprising therein, an extension plate $d$, a slide $e$ adjustably arranged in relation to said plate $d$, and a ball-bearing sliding in ways on said plate $e$, all arranged substantially as and for the purposes set forth.

5. In a bicycle saddle, the combination, of the saddle spring, a seat, and a sliding bearing, comprising therein a skeleton frame $i$, a pivotal pin $j$ connected with one end of the saddle spring, and wheels on said pin adapted to move on runners in said skeleton frame, substantially as and for the purposes set forth.

6. In a bicycle saddle, the combination, with the seat, and a saddle spring, of a saddle post socket and a pivotal support connected therewith, said support having the flat surfaces $k^4$ and $k^5$, a post $l^4$ on said saddle-post socket and a spring $m$, substantially as and for the purposes set forth.

In testimony that I claim the invention set forth above I have hereunto set my hand this 13th day of September, 1892.

ARTHUR CLEVELAND.

Witnesses:
FREDK. C. FRAENTZEL,
WM. H. CAMFIELD, Jr.